United States Patent [19]

Ranby et al.

[11] 4,396,863
[45] Aug. 2, 1983

[54] SYNTHETIC WILLEMITE PHOSPHORS AND FLUORESCENT LAMP CONTAINING THE SAME

[75] Inventors: Peter W. Ranby, Harrow Weald, Middlesex; David W. Smith, Waltham Abbey, Essex, both of England

[73] Assignee: Thorn EMI Limited, London, England

[21] Appl. No.: 293,978

[22] Filed: Aug. 18, 1981

[30] Foreign Application Priority Data

Aug. 21, 1980 [GB] United Kingdom ............... 8027276

[51] Int. Cl.$^3$ ............................................. C09K 11/46
[52] U.S. Cl. ............................. 313/486; 252/301.6 F; 428/403
[58] Field of Search ............... 252/301.6 F; 428/403; 427/64; 313/486

[56] References Cited

U.S. PATENT DOCUMENTS

2,241,939  5/1941  Aschermann et al. ....... 252/301.6 F
4,287,257  9/1981  Ohmatoi et al. ...................428/403

FOREIGN PATENT DOCUMENTS

52-22583  2/1977  Japan ................................. 427/64

*Primary Examiner*—Jack Cooper
*Attorney, Agent, or Firm*—Fleit, Jacobson & Cohn

[57] ABSTRACT

Synthetic willemite phosphor for use in fluorescent lamps in the form of particles coated with from 0.001% to 0.5% of an oxide of scandium, yttrium, lanthanum or a rare earth element. Fluorescent lamps comprising the phosphor which have improved aging qualities are also provided.

6 Claims, No Drawings

SYNTHETIC WILLEMITE PHOSPHORS AND FLUORESCENT LAMP CONTAINING THE SAME

The present invention relates to improved synthetic willemite phosphors for use in fluorescent lamps and to a process for their production. It also relates to fluorescent lamps incorporating the improved phosphors. Throughout the present specification, by the term 'synthetic willemite phosphors', we mean manganese activated zinc silicate phosphors of the type which are well known in the lighting art as fluorescent materials and which emit green light when exposed to ultra-violet irradiation. An example of such a material is zinc orthosilicate, $Zn_2SiO_4$ activated by approximately 1% by weight of manganese.

Synthetic willemite phosphors are particularly useful when the ultraviolet irradiation is of a wavelength in the region of 250 nm (e.g. 253.7 nm as in the low pressure mercury vapour discharge tubes widely used in commercially available fluorescent lamps) since at such a wavelength the visible green emission is particularly bright. Unfortunately the efficacy of the fluorescent emission from existing synthetic willemite phosphors decreases with use at a rate which is greater than the comparable rate of decline of other well known and commonly used phosphors such as the alkaline earth halophosphates or europuim activated yttrium oxide. In practice, in order to achieve light of other colours or substantially white light, the synthetic willemite phosphor is normally used in conjunction with one or more of these or other phosphors and its relatively more rapid deterioration means that the colour of the light emitted from a fluorescent lamp incorporating such a material will tend to change during operation.

It is an object of the present invention to provide an improved synthetic willemite phosphor which ages less rapidly than existing phosphors of this type. Accordingly we provide a synthetic willemite phosphor as hereinbefore defined in the form of particles suitable for fluorescent lamp production in which said particles are coated with from 0.001% to 0.5% by weight of the total phosphor of one or more oxides of formula $R_2O_3$ where R is an element selected from the group consisting of scandium, yttrium, lanthanum and the lanthanon or rare earth elements of atomic number 58 to 71. Particularly useful oxides are those wherein R is yttrium, gadolinium or lanthanum. Most conveniently the amount of oxide coating is within the range of from 0.03% to 0.3% by weight and a particularly suitable improved phosphor of the invention is coated with about 0.1% by weight of oxide.

Particles suitable for fluorescent lamp production are normally in the size range of from 3 to 30 microns.

Our invention also provides a process for the production of the above phosphor which comprises the steps of suspending particles of a synthetic willemite phosphor as hereinbefore defined in a solution of a salt of the element R, as hereinbefore defined, and whilst maintaining the suspension causing a compound containing the element R to be precipitated onto said particles. If the precipitated compound is not the oxide, further treatment to convert it to the oxide must be carried out. The particular salt used will of course depend on solubility in readily available solvents but we have found that, in the case of yttrium, lanthanum or gadolinium, an aqueous solution of the nitrate may be used. In this latter case precipitation of the hydroxide is easily accomplished by the addition of excess ammonia. The improved phosphor of the invention is then recovered by filtration and subsequent drying. The drying may optionally be followed by further heat treatment, for example at a temperature of from 200° C. to 800° C. for 10 to 60 minutes.

Our invention also provides fluorescent lamps comprising the above phosphor having improved ageing qualities. In particular we find that such a lamp after 500 hours of operation retains at least 90% and preferably from 92 to 96% of its original light output (in terms of lumens/watt) and this compares with figures of from 84 to 89% for the uncoated previously known material.

The invention is illustrated but in no way limited by the following examples wherein all parts and percentages are by weight.

EXAMPLE 1

A synthetic willemite phosphor (zinc orthosilicate containing approximately 1% by weight of manganese) (200 g.) of particle size distribution from 3 to 30 microns and median particle size (as determined by a Coulter counter) of 7.6. microns, was mixed into a slurry with demineralised water (400 ml.) at a temperature of 80° C. and 2 or 3 drops of phenolphthalein indicator added. The slurry was stirred and maintained at a temperature of about 80° C. and aqueous yttrium nitrate solution (20 ml.) containing the equivalent of 0.2 grams $Y_2O_3$ was stirred in. Ammonia solution was added drop-wise until the phenolphthalein indicator just changed from colourless to pink and the stirring of the slurry was maintained for a further 15 minutes. The willemite was then filtered off, washed several times on the filter with demineralized water and then dried at 120° C. and sieved through a 175 mesh sieve. Fluorescent lamps (40 watt) were then made up in which this treated phosphor was used for the fluorescent coating; at the same time an equal number of fluorescent lamps were made up in which the phosphor coating was synthetic willemite which had not been treated with the yttrium nitrate solution. Measurements of the light outputs in terms of lumens/watt of these fluorescent lamps after various times of operation gave the following results:

| | TIME (Hours) | | | | | |
|---|---|---|---|---|---|---|
| | 0 | 100 | 500 | 1000 | 2000 | 5000 |
| Average of Control Lamps (no yttrium treatment) | 104.6 (100%) | 98.9 (94.6%) | 89.6 (85.7%) | 86.1 (82.4%) | 77.6 (74.2%) | 67.7 (64.7%) |
| Average of Test Lamps (Yttrium treated willemite) | 101.2 (100%) | 97.9 (96.7%) | 93.8 (92.7%) | 89.3 (88.2%) | 82.6 (81.6%) | 73.3 (72.4%) |

It will be seen that although the initial output from the lamps using the treated willemite was slightly reduced compared with the untreated willemite, the fall in brightness during operation of the lamps was appreciably reduced.

EXAMPLE 2

The method of Example 1 was repeated, but in this case part of the yttrium treated willemite was heated to 600° C. for 30 minutes in air before being used to make fluorescent lamps. The lamp light output (lumens/watt) measurements were as follows:

|  | 0 hours | 100 hours | 500 hours |
|---|---|---|---|
| Average of Control lamps (no yttrium treatment) | 104.5 (100%) | 99.8 (95.5%) | 90.0 (86.1%) |
| Average of Test Lamps (yttrium treated willemite heated to 120° C.) | 102.2 (100%) | 98.6 (96.5%) | 95.0 (93.0%) |
| Average of Test Lamps (yttrium treated willemite heated to 120° C. then 600° C.) | 101.3 (100%) | 98.9 (97.6%) | 94.4 (93.2%) |

Again, the yttrium treated willemite lamps show a greater improvement in maintenance of light output during operation than those using untreated willemite.

EXAMPLE 3

The method of Example 2 was repeated but using an aqueous solution of lanthanum nitrate (20 ml) containing the equivalent of 0.2 grams of $La_2O_3$ in place of the yttrium nitrate.

EXAMPLE 4

The method of Example 2 was repeated but using an aqueous solution of gadolinium nitrate (20 ml) containing the equivalent of 0.2 grams of $Gd_2O_3$ in place of the yttrium nitrate.

The materials produced by Examples 3 and 4 were used to make fluorescent lamps which gave the following light output (lumers/watt) results

|  | TIME (Hours) | | | | | |
|---|---|---|---|---|---|---|
|  | 0 | 100 | 500 | 1000 | 2000 | 5000 |
| Average of Control Lamps (no treatment) | 102.7 (100%) | 97.7 (95.3%) | 92.3 (89.9%) | 85.7 (83.4%) | 78.1 (76.0%) | 66.5 (64.8%) |
| Average of lamps made using the phosphor of Example 3 | 99.7 (100%) | 96.6 (96.9%) | 95.3 (95.6%) | 89.4 (89.7%) | 84.2 (84.5%) | 73.9 (74.1%) |
| Average of lamps made using the phosphor of Example 4 | 99.6 (100%) | 98.9 (99.3%) | 95.9 (96.3%) | 89.5 (89.9%) | 84.1 (84.4%) | 72.5 (72.8%) |

What we claim is:

1. A manganese activated zinc silicate phosphor in the form of particles suitable for fluorescent lamp production in which said particles are coated with from 0.001% to 0.5% by weight of the total phosphor of one or more oxides of formula $R_2O_3$ wherein R is an element selected from the group consisting of scandium, yttrium, lanthanum and the lanthanon rare earth elements of atomic numbers 58 to 71, said coated particles when incorporated into a fluorescent lamp resulting in a lamp exhibiting, after 500 hours of operation, at least 90% of its original light output and a higher percentage light output than said lamp containing the corresponding uncoated phosphor particles, after 500 hours of operation.

2. A phosphor according to claim 1 wherein R is yttrium, gadolinium or lanthanum.

3. A phosphor according to claim 1 or claim 2 wherein said particles are coated with from 0.03% to 0.3% by weight of said one or more oxides.

4. A phosphor according to claim 3 wherein said particles are coated with about 0.1% by weight of said one or more oxides.

5. A phosphor according to claims 1 or 2 wherein said particles are of a size in the range of from 3 to 30 microns.

6. A fluorescent lamp comprising a phosphor having improved ageing properties such that after 500 hours of operation at least 90% of the original light output of the lamp is retained wherein said phosphor is a phosphor according to claim 1.

* * * * *